(12) United States Patent
Baker et al.

(10) Patent No.: US 12,462,654 B2
(45) Date of Patent: Nov. 4, 2025

(54) SYSTEMS AND METHODS FOR CUSTOMER-SPECIFIC CONTENT DELIVERY VIA ATM

(71) Applicant: Wells Fargo Bank, N.A., San Francisco, CA (US)

(72) Inventors: Jonathan Baker, San Francisco, CA (US); Carrie Anne Hanson, Charlotte, NC (US); Chris Graves, San Francisco, CA (US); Frank Digangi, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/604,236

(22) Filed: Mar. 13, 2024

(65) Prior Publication Data

US 2025/0292663 A1    Sep. 18, 2025

(51) Int. Cl.
*G07F 19/00* (2006.01)
*G06Q 40/02* (2023.01)
*H04L 67/306* (2022.01)

(52) U.S. Cl.
CPC ........... *G07F 19/206* (2013.01); *G06Q 40/02* (2013.01); *G07F 19/207* (2013.01); *H04L 67/306* (2013.01)

(58) Field of Classification Search
CPC ...... G07F 19/206; G06Q 40/02; H04L 67/306
USPC ......................................................... 235/379
See application file for complete search history.

(56) References Cited

U.S. PATENT DOCUMENTS

| | | |
|---|---|---|
| 2012/0265809 A1 | 10/2012 | Hanson et al. |
| 2013/0185148 A1 | 7/2013 | Townsend |
| 2017/0236107 A1 | 8/2017 | Arora |
| 2019/0156198 A1 | 5/2019 | Mars et al. |
| 2019/0325710 A1 | 10/2019 | King |
| 2020/0387752 A1* | 12/2020 | Kursun ............... G06F 16/9035 |
| 2022/0027875 A1 | 1/2022 | Akkapeddi et al. |

* cited by examiner

*Primary Examiner* — Toan C Ly
(74) *Attorney, Agent, or Firm* — Foley & Lardner LLP (57) ABSTRACT

Systems and methods for customer-specific content delivery via an automated teller machine (ATM) may include one or more server(s) which receive, from an ATM, data indicative of a user profile corresponding to a user of the ATM, the user performing a transaction via the ATM; identify a transaction history associated with the user profile; determine, via one or more first machine learning models hosted on the one or more servers, a context corresponding to at least one transaction of the transaction history; generate, via one or more second machine learning models, a content item according to the context determined by the one or more first machine learning models; and transmit the content item for display by the ATM to the user, the ATM displaying the content item for at least a portion of a duration in which the transaction is performed via the ATM.

17 Claims, 5 Drawing Sheets

SYSTEMS AND METHODS FOR CUSTOMER-SPECIFIC CONTENT DELIVERY VIA ATM

TECHNICAL FIELD

The present disclosure relates to using artificial intelligence to generate content for display on an automated teller machine (ATM).

BACKGROUND

Users can perform various transactions relating to accounts with a financial institution at ATMs. ATMs may not provide a user-specific experience when a user performs a transaction.

SUMMARY

This disclosure relates to systems, methods, and devices for generating and providing user-specific content on an ATM.

At least one aspect of this disclosure relates to a method. The method includes receiving, by one or more servers from an automated teller machine (ATM), data indicative of a user profile corresponding to a user of the ATM, the user performing a transaction via the ATM. The method further includes identifying, by the one or more servers, a transaction history associated with the user profile. The method further includes determining, by one or more first machine learning models hosted on the one or more servers, a context corresponding to at least one transaction of the transaction history. The method further includes generating, by one or more second machine learning models, a content item according to the context determined by the one or more first machine learning models. The method further includes transmitting, by the one or more servers, the content item for display by the ATM to the user, the ATM displaying the content item for at least a portion of a duration in which the transaction is performed via the ATM.

In some embodiments, generating the content item further includes transmitting, by the one or more servers, to one or more second servers, a request for content to incorporate into the content item, the request indicating the context for identification of the content corresponding to the content. In some embodiments, generating the content item further includes receiving, by the one or more servers, the content for incorporating into the content item from one or more second servers. In some embodiments, generating the content item further includes transmitting, by the one or more servers, a content item request to the one or more second machine learning models, the content item request identifying the content from the one or more second servers and the context for generating the content item. In some embodiments, determining the context further includes generating, by the one or more servers, one or more tags associated with each transaction of the transaction history. In some embodiments, determining the context further includes categorizing, by the one or more servers, each tag of the one or more tags into one or more categories, based on an association of the one or more tags. In some embodiments, determining the context further includes determining, by the one or more servers, the context according to the one or more categories. In some embodiments, the method further includes determining the context according to the one or more categories and data received from one or more sensors at the ATM. In some embodiments, the one or more sensors include at least one of a microphone or a camera.

In some embodiments, the transaction history includes a plurality of transactions with an entity associated with the ATM. In some embodiments, the plurality of transactions are across a plurality of accounts with the entity. In some embodiments, the user includes a first user. In some embodiments, the method further includes determining, by the one or more first machine learning models hosted on the one or more servers, the context according to the transaction history and a corresponding transaction history of a second user having demographic metrics which satisfy a matching criteria with demographic metrics of the first user. In some embodiments, the one or more first machine learning models include at least one of a text classifier, an association rule miner, a recommender system, or a neural network. In some embodiments, the one or more first machine learning models are trained using transaction history associated with financial accounts of the user and a search history of the user. In some embodiments, the one or more second machine learning models include at least one of a generative adversarial network or a variational autoencoder.

At least one aspect of this disclosure relates to system including a processing circuit including one or more processors and memory storing instructions that, when executed by the one or more processors, cause the processing circuit to receive, by one or more servers from an automated teller machine (ATM), data indicative of a user profile corresponding to a user of the ATM, the user performing a transaction via the ATM. The instructions may further cause the processing circuit to identify, by the one or more servers, a transaction history associated with the user profile. The instructions may further cause the processing circuit to determine, by one or more first machine learning models hosted on the one or more servers, a context corresponding to at least one transaction of the transaction history. The instructions may further cause the processing circuit to generate, by one or more second machine learning models, a content item according to the context determined by the one or more first machine learning models. The instructions may further cause the processing circuit to transmit, by the one or more servers, the content item for display by the ATM to the user, the ATM displaying the content item for at least a portion of a duration in which the transaction is performed via the ATM.

In some embodiments, the instructions that cause the processing circuit to generate the content item further cause the processing circuit to transmit, by the one or more servers, to one or more second servers, a request for content to incorporate into the content item, the request indicating the context for identification of the content corresponding to the content. In some embodiments, the instructions that cause the processing circuit to generate the content item further cause the processing circuit to receive, by the one or more servers, the content for incorporating into the content item from one or more second servers. In some embodiments, the instructions that cause the processing circuit to generate the content item further cause the processing circuit to transmit, by the one or more servers, a content item request to the one or more second machine learning models, the content item request identifying the content from the one or more second servers and the context for generating the content item. In some embodiments, the instructions that cause the processing circuit to determine the context further cause the processing circuit to generate, by the one or more servers, one or more tags associated with each transaction of the transaction history. In some embodiments, the instructions that cause the processing circuit to determine the context further cause the processing circuit to categorize, by the one or more servers, each tag of the one or more tags into one or more categories, based on an association of the one or more tags. In some embodiments, the instructions that cause the processing circuit to determine the context further cause the processing circuit to determine, by the one or more servers, the context according to the one or more categories.

In some embodiments, the instructions further cause the processing circuit to determine the context according to the one or more categories and data received from one or more sensors at the ATM. In some embodiments, the one or more sensors include at least one of a microphone or a camera. In some embodiments, the transaction history includes a plurality of transactions with an entity associated with the ATM. In some embodiments, the plurality of transactions are across a plurality of accounts with the entity. In some embodiments, the user includes a first user. In some embodiments, the instructions further cause the processing circuit to determine, by the one or more first machine learning models hosted on the one or more servers, the context according to the transaction history and a corresponding transaction history of a second user having demographic metrics which satisfy a matching criteria with demographic metrics of the first user. In some embodiments, the one or more first machine learning models include at least one of a text classifier, an association rule miner, a recommender system, or a neural network. In some embodiments, the one or more first machine learning models are trained using transaction history associated with financial accounts of the user and a search history of the user.

At least one aspect of the disclosure relates to an automated teller machine (ATM), including a display screen. The ATM may further include a communication interface. The ATM may further include a human-machine interface. The ATM may further include a processing circuit including one or more processors and memory storing instructions that, when executed by the one or more processors, cause the processing circuit to obtain, via the human-machine interface, data indicative of a user profile corresponding to a user of the ATM, the user performing a transaction via the ATM. The instructions may further cause the processing circuit to transmit, via the communication interface, the data indicative of the user profile to one or more servers. The instructions may further cause the processing circuit to receive, via the communication interface, from the one or more servers, a content item generated according to a context corresponding to at least one transaction of a transaction history associated with the user profile. The instructions may further cause the processing circuit to display, via the display screen, the content item for at least a portion of a duration in which the transaction is performed via the ATM.

In some embodiments, the instructions, when executed, may further cause the processing circuit to determine an idle period of the transaction. In some embodiments, the instructions, when executed, may further cause the processing circuit to render, via the display screen, the content item during the idle period of the transaction.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, systems, devices, and methods for generating user-specific content are disclosed according to various embodiments described herein. In some instances, the systems, devices, and methods described herein allow for ATMs to provide content items generated using artificial intelligence. Beneficially, the AI system can provide recommendations to users based on their transaction history with the financial institution. This may allow users who have not recently met with a banker to receive accurate and timely financial recommendations.

Further, by leveraging artificial intelligence to generate content items based on data relating to the user, a customer or user experience at an ATM can be enhanced. The process of performing a transaction may be easier and more seamless and provide a greater customer satisfaction. Additionally, the user or customer may receive information on beneficial services available to them through the financial institution. By leveraging a transaction history or other information of the user, the AI system may gain greater insight into customer preferences, which may allow the AI system to provide content that is more relevant to the user. For example, the AI system may determine, from a user's transaction history, that the user prefers Italian food. The AI system may deliver content relating to Italian restaurants to the user to gain interest, whereas without the AI system, the user may receive content relating to non-Italian restaurants, which may not interest the user.

Figure 1:
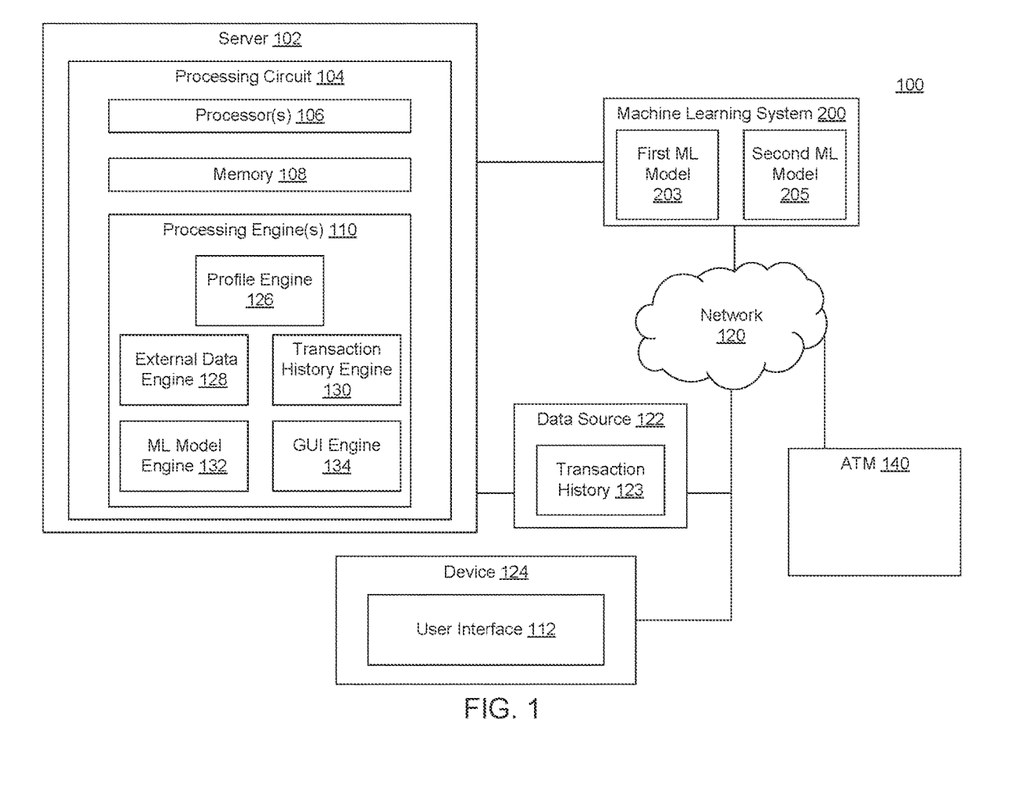
FIG. 1 is a block diagram of an ATM system, according to an exemplary embodiment.

Referring now to FIG. 1, a block diagram of system 100 (e.g., an ATM system) is shown, according to an exemplary embodiment. In brief overview, the system 100 includes a server 102 communicably coupled (e.g., via one or more networks 120) to an ATM 140, a machine learning system 200, one or more data sources 122, and a device 124. The system 100 may be affiliated with, maintained or managed by, or otherwise associated with a financial institution, such as a bank. As described in greater detail below, the system 100 may be configured to receive, by one or more servers 102, from an ATM (e.g., ATM 140), data indicative of a user profile corresponding to a user of the ATM. The system 100 may be configured to identify a transaction history 123 associated with the user profile. The system 100 may determine, by one or more first machine learning models (e.g., first ML model 203), a context corresponding to at least one transaction of the transaction history 123. The system 100 may be configured to generate, by one or more second machine learning models (e.g., second ML model 205), a content item. The content item may be generated according to the context determined by the one or more first machine learning models 203. The system 100 may be configured to transmit the content item for display by the ATM 140 to the user. The ATM 140 may display the content item for at least a portion of a duration in which the transaction is performed via the ATM.

The system 100 may include a server 102, the machine learning (ML) system 200, one or more data source(s) 122, an ATM 140, and one or more device(s) 124. The server 102, ML system 200, data source(s) 122, ATM 140, and device(s) 124 may be communicably coupled to one another via one or more networks 120.

The machine learning system 200, described in greater detail below with reference to FIGS. 2 and 3, may include a first ML model 203 and a second ML model 205. In some embodiments, the first ML model 203 may be similar to a first machine learning model 204 described with respect to FIG. 2. The first ML model 203 may be at least one of text classifier, an association rule miner, a recommender system, or a neural network. The first ML model 203 may be trained using transaction history associated with financial accounts of the user and a search history of the user. In some embodiments, the second ML model 205 may be similar to a second machine learning model 204 described with respect to FIG. 2. The second ML model 205 may be at least one of a generative adversarial network (GAN) or a variational autoencoder. In this regard, the machine learning system 200 may include a cascaded machine learning model in which the output of one machine learning model is fed as an input to a second machine learning model.

In various embodiments, the ML system 200 may determine a context corresponding to one or more transactions of the user at the ATM 140. The ML system 200 may also generate a content item according to the determined context. In various embodiments, the first ML model 203 may determine the context of one or more transactions and the second ML model 205 may generate the content item(s) according to the determined context. In various embodiments, the ML system 200 may utilize captured transactions (e.g., via a debit or credit card) to generate a video, list of recommendations, custom advertisements, etc. that may be of interest to the user. The ML system 200 may be configured to aggregate data and identify trends and/or patterns in user activity to display relevant data that the user wants to view. In some embodiments, the generated content may be algorithm-based. For example, the ML system 200 may utilize information from other users of a similar demographic to make recommendations or suggestions of what may be of interest to the user. For example, the ML system 200 may determine that a similar user has purchased a particular service, and may determine if the current user is also a target customer for the service.

The first ML model 203 may determine the context of a transaction by generating one or more tags associated with each transaction of the transaction history of the user. For example, the first ML model 203 may be a text classifier that categorizes or tags text (e.g., transaction history) into a class or label (e.g., tags the data as being part of a category). Tags may be applied to transactions based on, for example, a particular product type, a particular purchase location, etc. The text classifier may tag data as being a transaction related to, for example, groceries, travel, healthcare, entertainment, mortgage, etc. In some embodiments, the tags for transactions may be more specific. For example, a transaction may be tagged as being related to or occurring at a specific grocery store. The text classifier may tag the data by analyzing the title of a transaction and determining what category the transaction falls into. For example, the text classifier may determine the text of a transaction indicated that the transaction was at a hotel. The transaction may be tagged as a travel expense. The tag itself may be metadata (e.g., a description, label, or key word) attached to, appended to, or otherwise associated with the transaction. The tag may be used to manage or categorize transactions so that the ML system 200 can more easily parse the data for use in training one or more of the machine learning models.

The first ML model 203 may further categorize each tag into one or more categories. The tags may be categorized based on an association of the one or more tags. For example, the tags may be grouped into categories such as essential purchases, non-essential purchases, purchases belonging to a specific goal or event (e.g., wedding planning, home renovation). For example, a transaction tagged as being a vacation purchase may be categorized as being part of a non-essential category or as being part of an event (e.g., a honeymoon). In some embodiments, if the tag is more specific, the category may be more specific. For example, if a transaction is tagged as being a purchase at a specific grocery store, the tag may be categorized as being a grocery store purchase. The first ML model 203 may determine the context of the transaction and/or tag according to the one or more categories. For example, the first ML model 203 may receive a transaction history of a user. The first ML model 203 may generate a tag corresponding to each transaction. Each tagged transaction may be put into a category, such as a restaurant purchase, a clothing purchase, a homeowner purchase, a car maintenance purchase, etc.

In some embodiments, to generate the content item, the server 102 may be configured to communicate, transmit, send, or otherwise provide a request for content to a server (e.g., a second server) hosting the second ML model 205. The request may indicate the context for identification of the content corresponding to the content. The request may be made by the server 102. The second ML model 205 may receive, by the server 102, the content for incorporating into the content item from the second server. For example, the second ML model 205 may receive the context of one or more transaction items for use in generating a content item. Further, the server 102 may transmit a content item request to the second ML model 205. The content item request may identify the content from the second server and the context for generating the content item. For example, the request by server 102 may be for a content item that includes the context sent from the server 102 to the second server. The content item may be generated by offloading the content item from the first ML model 203 to the second ML model 205 (e.g., the second ML model 205, which is hosted on the second server, generates the content item). The second ML model 205 may be, for example, a variational autoencoder. The second ML model 205 may receive and use as inputs, for example, a context of one or more transactions and data such as previously generated content items. The variational autoencoder may sample the input data to generate content items (e.g., an output) based on the input data. The second ML model 205 may be located on or maintained by a second server. The server 102 may receive the content item and use the content item for display on the ATM 140. This may conserve computer resources in space at the server 102, as the server 102 may not have to maintain and continuously update the second ML model 205 in addition to the first ML model 203.

As a general overview of the system 100, a user performing a transaction at the ATM 140 may log into a user profile to perform the transaction. The user profile may be communicated to and received by the server 102. The server 102 may or be part of a server for a financial institution. The server 102 may analyze the user profile (e.g., by one or more processing engines 110 described herein) and retrieve a transaction history 123 of the user. The server 102 may transmit the information (e.g., user profile and transaction history) to the ML system 200. The ML system may use the information in a manner described herein to generate one or more content items, recommendations, advertisements, etc. relevant to the user. The user interface may be rendered locally on the ATM 140 or may be displayed on a user interface 112 of a device 124 (e.g., a device of the user).

In various embodiments, the ML system 200 may be configured to generate real-time information responsive to actions occurring in real-time. For example, the ML system 200 may determine the context of a transaction according to the one or more categories and data received from one or more sensors at the ATM. For example, and in some embodiments, the ATM 140 may include speakers, microphones, and/or cameras. The ATM 140 may utilize one or more of the sensor(s) to observe a user (e.g., watch, listen, etc.) and generate outputs responsive to the user. For example, a microphone of the ATM 140 may receive an audio input from a vehicle of the user performing a transaction at the ATM, such as a song that the user is listening to. The audio data received at the ATM 140 may be communicated to one or more components of the server 102, which is processed and transmitted to the ML system 200. The ML system 200 may utilize that information, in addition to other information, such as training inputs, transaction history, etc. to generate recommendations for the user. For example, the user may be listening to a country music station on the radio while performing a transaction at the ATM 140. The ATM 140 may transmit received audio information to the ML system 200, which may generate a recommendation for tickets to a nearby, upcoming country music concert to be displayed on the ATM 140. In some embodiments, the system 100 may be configured to access to a database or data structure related to venues (such as TICKETMASTER, STUBHUB, or other ticket exchange/provider) to provide an indication of, for example, a price or number of tickets remaining for the concert.

Figure 4:
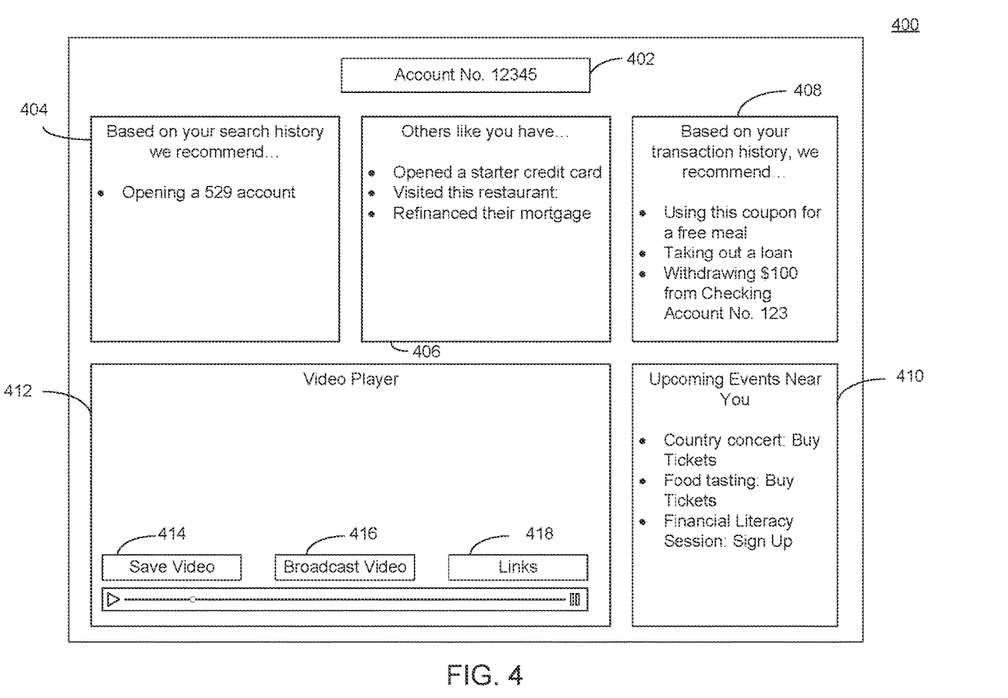
FIG. 4 is a diagram illustrating a graphical user interface of the system of FIG. 1, according to an exemplary embodiment.

In various embodiments, the ML system 200 may utilize generative AI to create content items for display on the ATM 140 and/or on the device 124. The content items are described in greater detail with respect to FIG. 400 (e.g., content item 412). The ML system 200 may generate, in real time, a content item, such as a video, to display on the ATM 140 to a user of the ATM 140, based on demographics of the user, transaction history of the user, and/or external data of the user.

The system 100 may include one or more ATMs 140. The ATM 140 may be an electronic banking outlet that allows customers to complete basic transactions without having to interact with a branch representative or teller of the financial institution. The ATM 140 may enable users to perform transactions such as, for example, withdrawing cash, depositing funds, checking account balances, and transferring money between accounts. Use of the ATM 140 may reduce a need for a user to make in-branch visits to complete various financial transactions. One or more ATMs for the financial institution may be located on site at branch locations, and/or in various public places, such as shopping centers, airports, and grocery stores. To use an ATM 140, customers may need a debit or credit card associated with the financial institution and a personal identification number (PIN) to access to their accounts.

The system 100 may include one or more device(s) 124. The device 124 may be or include any device, component, element, or hardware designed or configured to communicate with the ATM 140 and/or the server 102. In some embodiments, the device 124 may include a mobile device, a computer, or other device to be used by a user (e.g., a user of the ATM 140). In some embodiments, the device 124 may be a vehicle of the user completing a transaction at the ATM 140. The device 124 may be communicably coupled to the ATM 140 and/or the network 120.

The device 124 may communicate with the ATM 140. The device 124 may be at a location remote from the ATM 140. For example, the device 124 may be a personal device of a user and may display content generated by the ML system 200 based on a transaction by the user at the ATM 140. The device 124 may be a part of a vehicle of the user capable of displaying content. For example, the device 124 may be a screen on the dashboard of a vehicle capable of receiving and broadcasting content generated by the ML system 200.

The system 100 may include one or more data source(s) 122. The data sources 122 may be or include any device, component, element, or hardware designed or configured to send or otherwise communicate data to one or more components of the server 102 and/or the ATM 140. In some embodiments, the data sources 122 may include, for example, one or more data repositories storing transaction histories 123 of a plurality of other users having one or more accounts with the financial institution, and/or search histories and transaction histories of the user performing the current transaction at the ATM 140. The data sources 122 may be communicably coupled to the ATM 140 and/or the server 102, to receive (e.g., via the network 120) the transaction history 123 of the user.

The data sources 122 may store data to be used by one or more components of the ATM 140 which is not stored locally within the ATM 140. For example, the ATM 140 may not locally store data relating to transaction histories 123 of other users not currently performing a transaction at the ATM 140. Thus, responsive to a request for the transaction histories, a component of the server 102 (e.g., transaction history engine 130) may retrieve transaction history data 123 from the data source 122 for use when generating content based on similar user profiles for the current user. In various embodiments, the data source 122 may be a data repository storing data that is used to train the ML system 200.

The system 100 may include a server 102. The server 102 may be a remote server of the financial institution. The server 102 may include a processing circuit 104. The processing circuit 104 may be or include any device, component, element, or hardware designed or configured to implement various processes for generating content for users performing transactions at an ATM by implementing various processing engines 110 (e.g., by the processor(s) 106 executing corresponding instructions in memory 108). For example, the processing circuit 104 may be configured to execute, support, provision, or otherwise provide the ATM 140. The processing engine(s) 110 may include a profile engine 126, an external data engine 128, a transaction history engine 130, a ML model engine 132, and a GUI engine 134, all of which are described in greater detail below.

The processing circuit 104 may include one or more processors 106. The processors 106 may be implemented or performed with a general-purpose single- or multi-chip processor, a digital signal processor (DSP), an application specific integrated circuit (ASIC), one or more field programmable gate array (FPGAs), a logic circuit, or other suitable electronic processing components. A general-purpose processor may be a microprocessor, or, any conventional processor, or state machine. A processor 106 also may be implemented as a combination of computing devices, such as a combination of a DSP and a microprocessor, a plurality of microprocessors, one or more microprocessors in conjunction with a DSP core, or any other such configuration. In some embodiments, the one or more processors 106 may be shared by multiple circuits (e.g., the circuits of the processor may comprise or otherwise share the same processor which, in some example embodiments, may execute instructions stored, or otherwise accessed, via different areas of memory). Alternatively or additionally, the one or more processors 106 may be structured to perform or otherwise execute certain operations independent of one or more co-processors. In other example embodiments, two or more processors 106 may be coupled via a bus to enable independent, parallel, pipelined, or multi-threaded instruction execution. All such variations are intended to fall within the scope of the present disclosure.

The processing circuit 104 may include a memory 108. The memory 108 (e.g., memory, memory unit, storage device, etc.) may include one or more devices (e.g., RAM, ROM, Flash memory, hard disk storage, etc.) for storing data and/or computer code for completing or facilitating the processes, layers, and modules described in the present application. The memory 108 may be or include tangible, non-transient volatile memory or non-volatile memory. The memory 108 may also include database components, object code components, script components, or any other type of information structure for supporting the activities and information structures described in the present application. According to an exemplary embodiment, the memory 108 is communicably connected to the one or more processors via the processing circuit 104 and includes computer code for executing (e.g., by the processing circuit 104 and/or the one or more processors) one or more processes described herein. For example, the memory 108 may be embodied as a non-transitory computer readable medium storing instructions executable by the processor 106 to perform various functions of the processing engines 110 and/or the ATM 140 disclosed herein. In some embodiments, the memory 108 and the processor 106 are integrated as a single component.

The processing circuit 104 may include one or more processing engines 110. The processing engines 110 may be or include any device, component, element, or hardware designed or configured to perform certain dedicated functions of the processing circuit 104 and/or the ATM 140. For example, the processing engine(s) 110 may include the profile engine 126, the external data engine 128, the transaction history engine 130, the ML model engine 132 and the GUI engine 134, each described in greater detail below. While these processing engine(s) 110 are shown and described, in various embodiments, additional processing engine(s) 110 may be deployed at the server 102. Additionally, and in some embodiments, one or more of the processing engine(s) 110 may be combined with one or more other processing engine(s) 110. Further, and in some embodiments, one or more of the processing engine(s) 110 may be divided into multiple processing engine(s) 110. The processing engine(s) 110 are described in greater detail below.

The server 102, ML system 200, data source(s) 122, device 124, and ATM(s) 140 may be communicably coupled to one another via one or more network(s) 120. The network 120 may be or include any device, component, element, or hardware designed or configured to transmit, receive, and/or facilitate the exchange or share of resources, data, and/or information among one or more components of the system 100. In some embodiments, the network 120 may be a cloud-based network. The network 120 may be communicably coupled to the ML system 200, the ATM 140, the data source 122, and/or the device 124.

The network 120 may facilitate an exchange or communication of data not stored locally on the ATM 140. For example, the ATM 140 may offload transaction history 123 to one or more data sources 122. The ATM 140 and/or the server 102 may request to receive data from the data source 122 when needed (e.g., when retrieving transaction history from a user profile have similar characteristics to that of a user currently performing a transaction at the ATM 140). The network 120 may facilitate the receipt of the data from the data source 122 to the server 102. The ML system 200 may access the network 120 to retrieve data stored in the data source 122 that may be used as a training input or to generate a recommendation. For example, the ML system 200 may retrieve transaction history data 123 relating to other users (i.e., data that would not be stored locally on the ATM 140) for use in determining a recommendation for the user at the ATM 140.

As stated above, the processing engine(s) 110 may include the profile engine 126. The profile engine 126 may be or include any device, component, element, or hardware designed or configured to receive data indicative of a user profile corresponding to a user of the ATM 140. The user may be performing a transaction on the ATM 140. The profile engine 126 may be communicably coupled to the server 102, the ATM 140, and/or one or more components of the processing engine(s) 110, such as the external data engine 128, the ML model engine 132, the transaction history engine 130, and/or the GUI engine 134.

The user profile may be received by the profile engine 126 responsive to the user logging into the ATM 140. For example, the user may log into the ATM 140 by inserting a bank card and entering a PIN. The ATM 140 may transmit data of the user profile to the profile engine 126. The user profile may contain basic information about the user. For example, the user profile may include the user's account number, name, age, types of accounts, and/or linked accounts. The user profile may provide demographic information about the user. In various embodiments, the profile engine 126 may communicate the user profile or information within the user profile to one or more of the processing engines 110.

In some embodiments, the profile engine 126 may determine one or more user profiles of other users of the financial institution that belong to a similar demographic as the user performing the transaction on the ATM 140. For example, if the profile engine 126 determines from the user profile that the user at the ATM 140 is a 45 year old male with a savings account having a certain balance and two linked savings accounts belonging to his children, the profile engine 126 may retrieve profiles of users having one or more similarities to the user profile of the ATM user. For example, the profile engine 126 may retrieve profiles for a 43 year old male with a savings account having a similar balance and a profile for a 45 year old woman having two linked savings accounts belonging to her two children.

As stated above, the processing engine(s) 110 may include the external data engine 128. The external data engine 128 may be or include any device, component, element, or hardware designed or configured to receive external data corresponding to a user performing a transaction at the ATM 140. The external data engine 128 may be communicably coupled to the server 102, the ATM 140, and/or one or more components of the processing engine(s) 110, such as the profile engine 126, the ML model engine 132, the transaction history engine 130, and/or the GUI engine 134.

External data received by the external data engine 128 may be data not associated with the financial institution, but may be relevant to generating user-specific content items for the user. For example, the external data engine 128 may receive location histories of the user and/or search histories of the user. The external data engine 128 may be configured to receive the external data, responsive to the user logging in to the ATM 140, the ATM 140 pushing the log in information to the server 102, and/or the profile engine 126 communication user profile information to the external data engine 128. For example, the ATM 140 may push, communicate, transmit, or otherwise provide an indication of the user log-in via various types or forms of networks 120, such as (but not limited to) a dial-up network, leased line of a branch, ethernet or broadband, a virtual private network (VPN), integrated services digital network (ISDN), or any other type of network 120 which may be used for communication by an ATM 140 to one or more remote locations. In various embodiments, a user profile of a user for a financial institution may be linked to one or more additional accounts belonging to the user. For example, the user may link the account at the financial institution to an account for a search engine. By linking the accounts, the server 102 may receive the account information of the user's financial institution account, such as transaction history, as well as account information for the linked search engine account, such as search history. The external data engine 128 may be configured to access the data from the user's search engine account for use in training the ML system 200.

The external data engine 128 may receive external data via the network 120. External data may be, for example, advertisement preference data utilized by the financial institution to understand content preferences of the user. External data may also be, for example, a browser history or location data/history. For example, a user may have opted to share location data with an application of the financial institution. Therefore, the server 102 of the financial institution may receive a location history of the user via the network 120. For example, the external data engine 128 may receive location data indicating that a user visits a specific restaurant three times per month. The external data engine 128 may also receive search history results indicating that a user has visited the website for the restaurant five times per month. This data may be used by the ML system 200 to generate a recommendation for the user. For example, the ML system 200 may use the data to recommend similar restaurants in the area to the user, or to generate an advertisement for a similar restaurant in the area.

The processing engine(s) 110 may include the transaction history engine 130. The transaction history engine 130 may be or include any device, component, element, or hardware designed or configured to determine a transaction history (e.g., transaction history 123) associated with the user performing a transaction at the ATM 140. The transaction history engine 130 may be communicably coupled to one or more components of the processing engine(s) 110, such as the profile engine 126, the external data engine 128, the ML model engine 132, and/or the GUI engine 134.

The transaction history engine 130 may identify the transaction history associated with the user or a user profile of the user performing a transaction on the ATM. The transaction history engine 130 may identify the transaction history responsive to the profile engine 126 communicating the user profile. The transaction history may be retrieved from, for example, from the memory 108 of the server 102, after the user has inserted their card and entered their PIN into the ATM 140 (i.e., after the user has logged into their account on the ATM 140). In some embodiments, transaction history engine 130 may be configured to determine the transaction history 123 of the user, by accessing the data source 122 via the network 120. The transaction history 123 may be transaction history for the user performing the transaction at the ATM 140, and/or other users (e.g., other user profiles of users belonging to the financial institution). The transaction history 123 of a user may include, for example, previous transactions performed at an ATM or other location (e.g., in a bank branch). For example, a transaction history 123 may include previous withdrawals, deposits, etc. into one or more accounts belonging to the user and/or associated with a user profile of the user. In some embodiments, a transaction history 123 may include transactions made with a credit and/or debit card. For example, the transaction history 123 may include a location or retailer at which a purchase and/or return was made, a dollar amount of a purchase and/or return, a quantity of items purchased and/or returned, a description of items purchased and/or returned, etc. The transaction history may further include, for example, cash back rewards of a credit card of the user.

In some embodiments, the transaction history 123 may include transactions from other users of the financial institution. The transaction history engine 130 may receive an indication that a user at the ATM 140 has logged in. Responsive to receiving, from the profile engine 126, the user profile of the user at the ATM 140 and a list of user profiles of users having similarities to the user at the ATM, the transaction history engine 130 may identify the transaction histories 123 for each of the user profiles with similarities. In some embodiments, such information may be scrubbed such that individual transaction information (e.g., bank account(s), amounts, dates, etc.) may not be available to the transaction history engine 130, but transaction types and identifying information is available to the transaction history engine 130. The transaction history engine 130 may transmit the transaction histories 123 of similar users to the ML system 200 for use in generating content. The transaction history 123 may be used to identify transactions by similar users that the user at the ATM 140 has or has not yet made and generate custom advertisements for the user.

The transaction history engine 130 may communicate transaction histories 123 to the ML model engine 132 and/or the ML system 200 for generating user-specific content. One or more transactions may be utilized in conjunction by the ML system 200 to make recommendations for the user. For example, the transaction history engine 130 may receive a transaction history 123 indicating that the user has taken out a home equity line of credit and has made several large purchases at a home improvement store over the last three months. The ML system 200 may use this information as inputs to predict that a user is or will soon be performing a home renovation and output content such as deals at the home improvement store, videos on performing home renovations, and/or a recommendation to refinance the home.

In various embodiments, the ML system 200 may utilize both the external data received from the external data engine 128 and the transaction history 123 received from the transaction history engine 130 to generate outputs for the user at the ATM 140. For example, external data may indicate that a user has performed multiple browser searches for a reviews or recommendations on a smoker. Transaction history 123 may indicate that the user has made a $700 purchase at grill store. The ML system 200 may utilize this information to predict that the user purchased a smoker at the grill store and enjoys smoking meat. The ML system 200 may utilize this information to generate recommendations for barbecue restaurants in the area.

The processing engine(s) 110 may include the ML model engine 132. The ML model engine 132 may be or include any device, component, element, or hardware designed or configured to maintain a machine learning model trained to generate one or more user-specific content items for display at an ATM 140 at which a user is performing a transaction. The ML model engine 132 may also apply, to the machine learning model, (i.e., ML system 200), data corresponding to the transaction history 123 determined by the transaction history engine 130 and the external data received by the external data engine 128. The ML model engine 132 may be communicably coupled to one or more components of the processing engine(s) 110, such as the profile engine 126, the external data engine 128, the transaction history engine 130, and/or the GUI engine 134.

The ML model engine 132 may maintain the ML system 200. The ML model engine 132 may alternatively or additionally apply, as an input to the ML system 200, data corresponding to the transaction history 123 and the external data. Thus, in some embodiments, the machine learning system 200 may be stored in one or more components of the server 102 (e.g., the processing circuit 104). As described below with reference to FIGS. 2 and 3, the ML system 200 may be trained to determine, by one or more first machine learning models (e.g., first ML model 203), a context corresponding to at least one transaction of the transaction history of the user at the ATM 140. The context may be related to the transaction history 123 and/or external data received by the ML model engine 132. The first ML model 203 may determine a user's preferences or current/upcoming life events based on previous transactions by the user. For example, the user may have a 529 education plan or other college savings account that has just turned 17 years old. The first ML model 203 determine that the context around the account is that the user has a child that will soon be going to college and money with be withdrawn from the account. The ML system 200 may further generate, by one or more second machine learning models (e.g., second ML model 205), a content item according to the context determined by the one or more first machine learning models. For example, the second ML model 205 may generate, based on the context that a user has a child going to college soon, recommendations for credit cards for college students, a prompt to take out a new loan, a recommendation for a nearby test preparation center, etc. User-specific content items generated by the second ML model 205 may include content, such as advertisements, financial and/or non-financial recommendations, and/or videos relevant to a user.

The processing engine(s) 110 may include the GUI engine 134. The GUI engine 134 may be or include any device, component, element, or hardware designed or configured to transmit the content item generated by the ML system 200 for display by the ATM 140 to the user. The ATM 140 may display the content item for at least a portion of a duration in which the transaction is performed via the ATM 140. The GUI engine 134 may be communicably coupled to one or more components of the processing engine(s) 110, such as the profile engine 126, the external data engine 128, the transaction history engine 130, and/or the ML model engine 132, and the user interface 112, and/or the device 124.

The GUI engine 134 may receive the user-specific generated content (i.e., outputs of the ML system 200) from, for example, the ML system 200 or the ML model engine 132. The GUI engine 134 may provide generated to be displayed. The GUI engine 134 may further update the user interface responsive to a new or updated output from the ML system 200. In various embodiments, the GUI engine 134 may display the information on the user interface 112 of the ATM 140 and/or on the device 124. In some embodiments, the GUI engine 134 may display the information on a user interface of the device 124. For example, the device 124 may be a personal device of the user (e.g., mobile phone, tablet, etc.), and the GUI engine 134 may facilitate displaying the information on a screen of the device. In some embodiments, the device 124 may be a screen in a vehicle of the user at the ATM 140, and the GUI engine 134 may facilitate displaying the information on the screen via a broadcast.

The device 124 may include a user interface 112 which displays, provides, or otherwise renders the GUI generated by the GUI engine 134. In some embodiments, the user interface 112 may be displayed a screen of the ATM 140 and/or a screen or display of the device 124. The user interface 112 may be communicably coupled to one or more components of the ATM 140, such as the processing circuit 104.

The user interface 112 may display the content and/or other outputs by the ML system 200. For example, the user interface may receive, from the ML model engine 132, user-specific advertisements, and display the advertisements in one or more manners. The user interface may also include information about the user, such as the user account number, and additional content items, such as a video including content relevant to the user.

In various embodiments, the content displayed on the user interface 112 of the ATM 140 may be transferred for display on another device 124. For example, the content on the ATM 140 may be transferred and displayed on the user's mobile phone. The user may select a button on the ATM 140 to transfer the content to the device 124 to watch after the user is no longer at the ATM, to get additional information on the displayed content, etc. The user interface will be described in greater detail with respect to FIG. 4.

Figure 2:
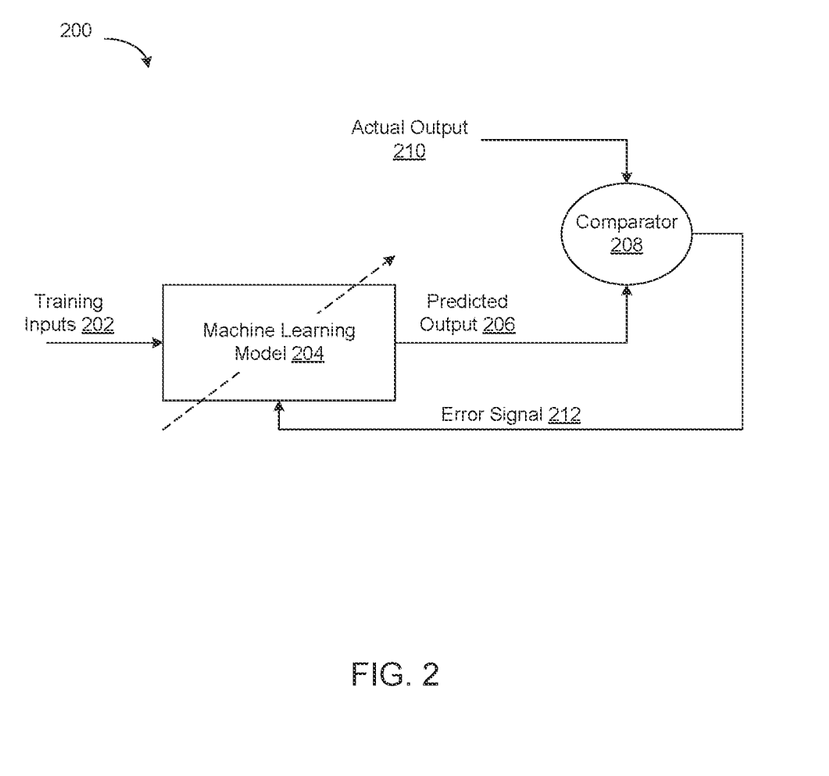
FIG. 2 is a block diagram of a machine learning system, according to an exemplary embodiment.

Referring to FIG. 2, a block diagram of an example system using supervised learning, is shown. Supervised learning is a method of training a machine learning model given input-output pairs. An input-output pair is an input with an associated known output (e.g., an expected output).

Machine learning model 204 may be trained on known input-output pairs such that the machine learning model 204 can learn how to predict known outputs given known inputs. Once the machine learning model 204 has learned how to predict known input-output pairs, the machine learning model 204 can operate on unknown inputs to predict an output.

The machine learning model 204 may be trained based on general data and/or granular data (e.g., data based on a specific user 232) such that the machine learning model 204 may be trained specific to a particular user 232.

Training inputs 202 and actual outputs 210 may be provided to the machine learning model 204. Training inputs 202 may include a transaction history (credit or debit card purchases, credit or debit card withdrawals, etc.), of a first user performing a transaction at the ATM 140, a transaction history of a second user matching the demographic of the first user, search histories of the first user, location data of the first user, contexts of previously identified transaction, previously generated content items based off of contextualized transactions, and the like.

The inputs 202 and actual outputs 210 may be received from any of the data repositories, such as the data source 122. For example, a data repository may contain transaction histories, search histories, and/or location data of the user performing the transaction at the ATM 140. The data repository may also contain data associated with one or more second users. For example, the data repository may include transaction history or other data relating to a user having a similar user profile to that of the first user. Thus, the machine learning model 204 may be trained to predict a context of one or more transactions by the first user, and subsequently generate one or more content items from the contextualized transactions, based on the training inputs 202 and actual outputs 210 used to train the machine learning model 204.

The system 100 may include one or more machine learning models 204. In an embodiment, a first machine learning model 204 may be trained to predict data relating to a context of one or more transactions of a user. For example, the first machine learning model 204 may use the training inputs 202, such as a transaction history of one or more users to predict outputs 206, such as a predicted context of one or more transactions by a user currently performing a transaction at the ATM, by applying the current state of the first machine learning model 204 to the training inputs 202. The comparator 208 may compare the predicted outputs 206 to actual outputs 210, such as an actual context of a transaction, to determine an amount of error or differences. For example, the predicted context(s) of one or more transactions (e.g., predicted output 206) may be compared to the actual determined context(s) of one or more transactions (e.g., actual output 210). For example, predicted outputs 206 may predict a context for one or more transactions and the comparator 208 may compare the predicted contexts to actual determined contexts for the same or same types of transactions. The comparator 208 may determine how many predicted outputs 206 (e.g., predicted transaction contexts) match the actual outputs 210 (e.g., actual transaction contexts).

In other embodiments, a second machine learning model 204 may be trained to make one or more recommendations to the user 232 based on the predicted output from the first machine learning model 204. For example, the second machine learning model 204 may use the training inputs 202, such as transaction histories and previously contextualized transactions, to predict outputs 206, such as predicted generated content items (predicted recommendations for restaurants, stores, etc., predicted user-specific advertisements, predicted user-specific videos, etc.), by applying the current state of the second machine learning model 204 to the training inputs 202. The second machine learning model 204 may use outputs of the first machine learning model 204 as inputs. For example, the first machine learning model 204 may predict a context of a transaction by a user. The second machine learning model 204 may utilize the context of the transaction to generate a content item relating to the context of the transaction. A content item may be a recommendation of a financial action to take, a prompt asking the user if they would like to take an action, a custom advertisement, and/or a video. The video may display an advertisement for a restaurant that the first machine learning model has predicted aligns with the user's interests. The video may also be an informational video, such as one providing information on financial information. For example, the first machine learning model 204 may determine that five transactions in one month were over a predetermined amount and were at a home improvement store, and may predict that the user is performing home renovations. The second machine learning model 204 may utilize the contextualized transactions to generate, for example, a custom recommendation or prompt for the user to take out a loan. The second machine learning model 204 may generate a plurality of content items. For example, along with the prompt to take out a loan, a video may be generated that provides information on loan repayment options. The video may be interactive (e.g., the user can respond to questions, provide feedback, provide selections that determine future content, etc.). The comparator 208 may compare the predicted outputs 206 to actual outputs 210, such as actual content items to determine an amount of error or differences. The user may be able to indicate whether a generated content item is relevant or if fewer similar content items should be generated. The comparator 208 may then compare a predicted output 206, which may be a content item predicted to be enjoyed by the user, to an actual output 210, which may be an indication that the user does not like the content item. The machine learning system 200 may utilize this information to refine what types of content items the user may like.

The actual outputs 210 may be determined based on historic data of recommendations made to the user. In an illustrative non-limiting example, one or both of the first and second machine learning models 204 may utilize previously determined contexts(s) of previously performed transactions and/or previously generated user-specific content item. The ML models 204 may use the historic data to generate properly contextualized items and/or content items displaying content relevant and of interest to the user. For example, the first machine learning model may use historical transaction data to determine that multiple savings account withdrawals have been made by a user with no checking account. The second machine learning model may utilize historical data indicating that the user has previously been interested in content providing information on a checking account, and may generate a content item asking if the user would like to open a checking account.

In some embodiments, a single machine leaning model 204 may be trained to contextualize transactions of a user and generate content items for the user based on the contextualized transactions and based on user data received from, for example the ATM 140, data source 122, and/or transaction history engine 130. That is, a single machine leaning model may be trained using the training inputs, such as transaction history, previously determined transaction contexts, and previously generated content items to predict outputs 206, such as contexts of current transactions and content items for a current user, by applying the current state of the machine learning model 204 to the training inputs 202. The comparator 208 may compare the predicted outputs 206 to actual outputs 210, such as actual contexts of transactions and actual generated content items, to determine an amount of error or differences. The actual outputs 210 may be determined based on historic data associated with the recommendation to the user 232.

During training, the error (represented by error signal 212) determined by the comparator 208 may be used to adjust the weights in the machine learning model 204 such that the machine learning model 204 changes (or learns) over time. The machine learning model 204 may be trained using a backpropagation algorithm, for instance. The backpropagation algorithm operates by propagating the error signal 212. The error signal 212 may be calculated each iteration (e.g., each pair of training inputs 202 and associated actual outputs 210), batch and/or epoch, and propagated through the algorithmic weights in the machine learning model 204 such that the algorithmic weights adapt based on the amount of error. The error is minimized using a loss function. Non-limiting examples of loss functions may include the square error function, the root mean square error function, and/or the cross entropy error function.

The weighting coefficients of the machine learning model 204 may be tuned to reduce the amount of error, thereby minimizing the differences between (or otherwise converging) the predicted output 206 and the actual output 210. The machine learning model 204 may be trained until the error determined at the comparator 208 is within a certain threshold (or a threshold number of batches, epochs, or iterations have been reached). The trained machine learning model 204 and associated weighting coefficients may subsequently be stored in memory 216 or other data repository (e.g., a database) such that the machine learning model 204 may be employed on unknown data (e.g., not training inputs 202). Once trained and validated, the machine learning model 204 may be employed during a testing (or an inference phase). During testing, the machine learning model 204 may ingest unknown data to predict future data (e.g., future content items, context of future transactions, and the like).

Figure 3:
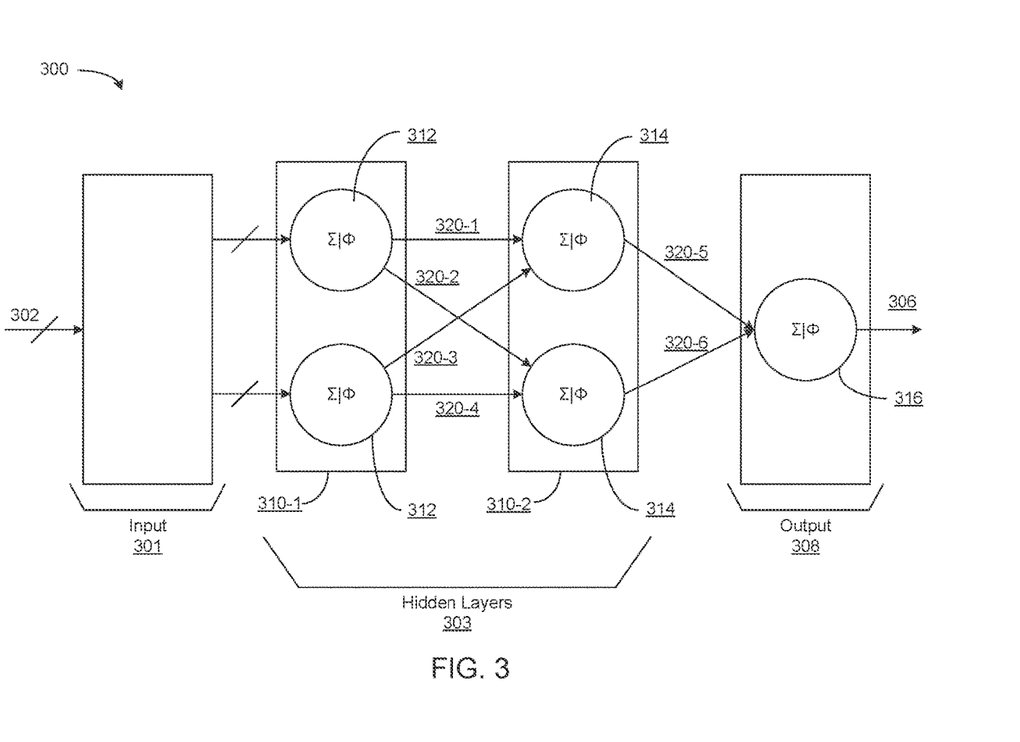
FIG. 3 is a block diagram illustrating a neural network, according to an exemplary embodiment.

Referring to FIG. 3, a block diagram of a simplified neural network model 300 is shown. The neural network model 300 may include a stack of distinct layers (vertically oriented) that transform a variable number of inputs 302 being ingested by an input layer 304, into an output 306 at the output layer 308.

The neural network model 300 may include a number of hidden layers 310 between the input layer 304 and output layer 308. Each hidden layer has a respective number of nodes (312, 314 and 316). In the neural network model 300, the first hidden layer 310-1 has nodes 312, and the second hidden layer 310-2 has nodes 314. The nodes 312 and 314 perform a particular computation and are interconnected to the nodes of adjacent layers (e.g., nodes 312 in the first hidden layer 310-1 are connected to nodes 314 in a second hidden layer 310-2, and nodes 314 in the second hidden layer 310-2 are connected to nodes 316 in the output layer 308). Each of the nodes (312, 314 and 316) sum up the values from adjacent nodes and apply an activation function, allowing the neural network model 300 to detect nonlinear patterns in the inputs 302. Each of the nodes (312, 314 and 316) are interconnected by weights 320-1, 320-2, 320-3, 320-4, 320-5, 320-6 (collectively referred to as weights 320). Weights 320 are tuned during training to adjust the strength of the node. The adjustment of the strength of the node facilitates the neural network's ability to predict an accurate output 306.

In some embodiments, the output 306 may be one or more numbers. For example, output 306 may be a vector of real numbers subsequently classified by any classifier. In one example, the real numbers may be input into a softmax classifier. A softmax classifier uses a softmax function, or a normalized exponential function, to transform an input of real numbers into a normalized probability distribution over predicted output classes. For example, the softmax classifier may indicate the probability of the output being in class A, B, C, etc. As, such the softmax classifier may be employed because of the classifier's ability to classify various classes. Other classifiers may be used to make other classifications. For example, the sigmoid function, makes binary determinations about the classification of one class (i.e., the output may be classified using label A or the output may not be classified using label A).

Referring now to FIG. 4, a user interface (UI) 400 showing user-specific content items is shown, according to an exemplary embodiment. The UI 400 may be configured to display, for example, on a screen or user interface 112 of the ATM 140 or the device 124, one or more content items generated by the ML system 200. The user interface 400 may additionally display information relating to the transaction currently being performed at the ATM 140. For example, the UI 400 may display information for withdrawing funds from the ATM 140. The user-specific content generated by the ML system 200 may be displayed with the information related to the transaction and/or instead of the transaction information. For example, the user-specific content may be displayed with the transaction information while the user is actively performing steps to complete the transaction (e.g., while selecting an option to withdraw funds), and the user-specific content may be displayed instead of the transaction information while the user is waiting for the transaction to be performed (e.g., while the ATM is preparing to dispense the funds).

In various embodiments, one or more content items of the UI 400 described with respect to FIG. 4 may be interactive. The user may be able to select content generated by the UI 400 to receive more information on the recommendation or advertisement. For example, if a recommendation is generated for a coupon for a restaurant, the user may select the recommendation to save the coupon or visit the website of the restaurant. If the content is displayed on the ATM 140, the links may be opened or otherwise stored on a linked device of the user. For example, the user may select to save a coupon on the ATM 140 and the coupon may be saved in a mobile application of the financial institution on the user device of the user. If the content is displayed on the device 124 (i.e., a user device), links may open on the device via a mobile application of the financial institution.

In various embodiments, the user may provide feedback on one or more content items displayed on the UI 400. The feedback may be, for example, whether the user liked or disliked the content, whether the content was relevant, etc. The feedback may be utilized by the ML system 200 as a training input to better train the ML models.

The user interface 400 may display user data 402 corresponding to the user performing a transaction at the ATM 140. For example, user data 402 may include an account number of the user, as shown in FIG. 4. The user data 402 may further include user profile information, such as the user's name, account balances, etc.

The UI 400 may display a recommendation 404 based on the user's search history. For example, the UI 400 may display a recommendation for opening a college savings account based on the ML system 200 determining that the user has searched for items such as "how to save money for my child's education." In some embodiments, the recommendation 404 may be based on both the user's search history and the user's transaction history.

The UI 400 may also display a recommendation 406 based on user data of users determined to be similar to the user currently at the ATM 140. For example, as described above, the server 102 or the ML system 200 may determine that other users of the financial institution match the user profile of the user at the ATM. The generated recommendation may be based on or include transactions or contexts of transactions of other similar users. For example, if another user is the same age of the current ATM user, also owns a home and has similar financial goals or indicators, and has also recently performed refinanced their mortgage, the recommendation 406 may indicate that others have refinanced their mortgage and the user may consider doing the same The UI 400 may also include a recommendation 408 based on a transaction history. For example, the ML system 200 may determine that previous transactions by the user indicate that they are preparing to open a business. The recommendation 408 may be to take out a small business loan. The recommendation 408 may also be a recommendation of a transaction to make at the ATM 140. For example, the user may visit an ATM every week and withdraw $100. The ATM, upon the user logging in, may recommend that the user opts to withdraw $100 from their checking account.

The UI 400 may also include a recommendation 410 indicating upcoming events. The upcoming events may be determined by one or more of transaction history, search history, location data, transaction histories of similar users, etc. The upcoming events may also be determined by the ML system 200 receiving an audio, visual, etc. input from the ATM 140 relating to the user at the ATM. For example, if a user visits an ATM ten times, a camera may identify the make, model, etc. of the vehicle associated with the user account that is logged into when the vehicle is at the ATM. A microphone on the ATM 140 may determines that the vehicle has been playing country music a certain number of times over the last ten visits, the ML system 200 may generate a recommendation for an upcoming country music concert nearby. The recommendation 410 may include an external link to purchase event tickets. In another example, a microphone on the ATM 140 receives an audio input indicating the user is stressed or confused about their finances. The ML system 200 may recommend an upcoming financial literacy session hosted by the financial institution for the user to attend.

The UI 400 may also include a video 412. The video may include information or content based on one or more of the user's transaction history, search history, etc. The video may provide, for example, information on starting a college savings account, information on how to increase a credit score, etc. The video may additionally or alternatively provide, information or advertisements for nearby restaurants, stores, etc. The video 412 may include an option 414 to save the video. The video may be saved to the user profile of the user on, for example, a mobile application of the financial institution. The video 412 may also have an option 416 to broadcast the video to a device 124 of the user. For example, the video may be broadcast, using, for example, a Bluetooth connection, to a mobile phone of the user or a screen of the vehicle of the user. The video 412 may further include an option 418 to open or visit any links corresponding to content shown in the video.

Figure 5:
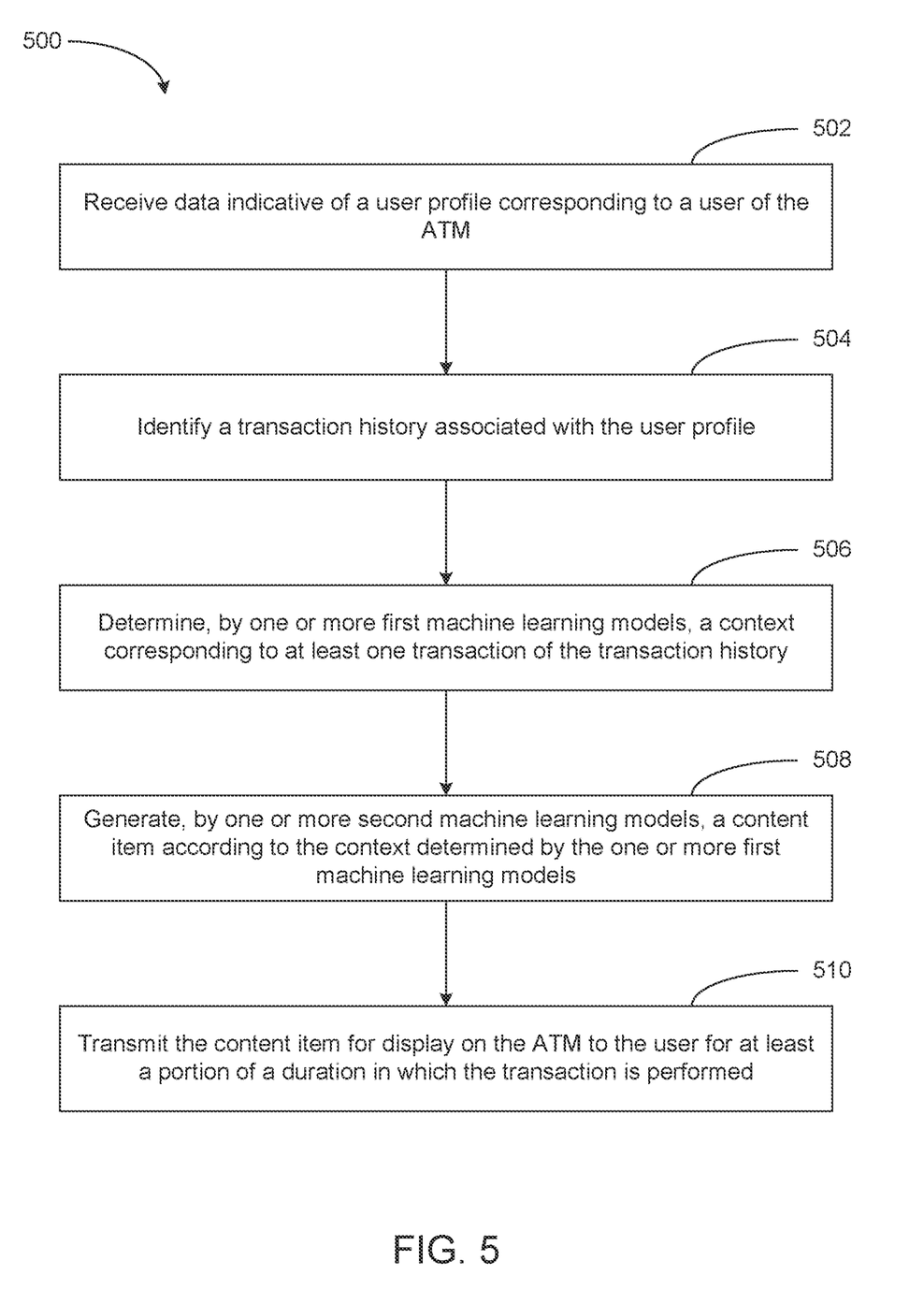
FIG. 5 is a flow diagram of a method of generating user-specific content on an ATM system, according to an exemplary embodiment.

Referring now to FIG. 5, a method 500 for generating user-specific content for rendering on an ATM is shown, according to an exemplary embodiment. At step 502, server receives data indicative of a user profile corresponding to a user of the ATM. At step 504, a transaction history associated with the user profile is identified. At step 506, a context corresponding to at least one transaction of the transaction history is determined by a first machine learning model. At step 508, a content item according to the context determined by the first machine learning models is generated by a second machine learning model. At step 510, content item is transmitted for display on the ATM to the user for at least a portion of a duration in which the transaction is performed.

At step 502, the method 500 may include receiving, by one or more servers (e.g., server 102 or profile engine 126) from an ATM (e.g., ATM 140), data indicative of a user profile corresponding to a user of the ATM. The user may be performing a transaction via the ATM when the server receives the data indicative of the user profile from the ATM 140. The data may be received responsive to the user at the ATM 140 inputting log-in credentials into the ATM 140.

At step 504, the method 500 may include identifying a transaction history associated with the user profile. The transaction history may be identified by the transaction history engine 130. The transaction history may be identified responsive to the user profile being received at the server 102 (e.g., by the profile engine 126). The transaction history may include a plurality of transactions with an entity associated with the ATM. For example, the transaction history may include transactions by the user within the last year. The plurality of transactions may be across a plurality of accounts with the entity. For example, the user may have more than one account with the financial institution (e.g., a checking account and a savings account), and the transaction history may include transactions from both of the accounts.

At step 506, the method 500 may include determining, by one or more first machine learning models (e.g., first ML model 203), a context corresponding to at least one transaction of the transaction history. The ML model may be hosted on the server (e.g., server 102). The context may be determined responsive to the first ML model receiving the transaction history of the user from the transaction history engine 130.

In some embodiments, determining the context of the transaction(s) may include generating one or more tags associated with each transaction of the transaction history. Determining the context of the transaction(s) may further include categorizing each tag of the one or more tags into one or more categories. The categories may be, for example, a type of transaction (e.g., restaurant purchase, loan payment, etc.). The tags may be categorized based on an association of the one or more tags. Determining the context of the transaction(s) may further include determining the context according to the one or more categories. In some embodiments, determining the context of the transaction(s) may include determining the context according to the one or more categories and data received from one or more sensors at the ATM. The one or more sensors may be or include at least one of a microphone or a camera. For example, the ATM 140 may include a microphone configured to receive an audio input of the user and transmit the audio information to the first ML model 203 to determine information about the user.

In some embodiments, the user may be a first user. The method 500 may further include determining, by the one or more first machine learning models, the context according to the transaction history and a corresponding transaction history of a second user having demographic metrics which satisfy a matching criteria with demographic metrics of the first user. For example, the transaction history engine 130 may determine a transaction history of the user performing the transaction at the ATM and a transaction history of another user with a similar user profile to that of the first user. The context may be determined responsive to the first ML model 203 receiving the plurality of transaction histories.

In some embodiments, the one or more first machine learning models may be at least one of a text classifier, an association rule miner, a recommender system, or a neural network. The one or more first machine learning models may be trained using a transaction history associated with financial accounts of the user and a search history of the user. For example, the first ML model 203 may utilize a transaction history 123 from the transaction history engine 130 and a search history of the user from the external data engine 128 to generate a context of one or more transactions.

At step 508, the method 500 may include generating, by one or more second machine learning models (e.g., second ML model 205), a content item according to the context determined by the one or more first machine learning models. The content item may be generated responsive to the first ML model producing an output (e.g., a context) used by the second ML model as an input.

In some embodiments, generating the content item includes transmitting, by the server 102, to one or more second servers, a request for content to incorporate into the content item. The request may indicate the context for identification of the content corresponding to the content. Generating the content item may further include receiving, by the server 102, the content for incorporating into the content item from the one or more second servers. Generating the content item may further include transmitting, by the server 102, a content item request to the one or more second machine learning models. The content item request may identify the content from the one or more second servers and the context for generating the content item.

In some embodiments, the one or more second machine learning models may be or include at least one of a generative adversarial network or a variational autoencoder.

At step 510, the method 500 may include transmitting the content item for display by the ATM to the user. The ATM may display the content item for at least a portion of a duration in which the transaction is performed via the ATM. The content item may be transmitted for display, responsive to the second ML model generating the content item.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include software for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

Accordingly, the "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions include, for example, instructions and data which cause general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A method comprising:
   receiving, by one or more servers from an automated teller machine (ATM), data indicative of a user profile corresponding to a user of the ATM, the user performing a transaction via the ATM;
   identifying, by the one or more servers, a transaction history associated with the user profile;
   determining, by one or more first machine learning models hosted on the one or more servers, a context corresponding to at least one transaction of the transaction history;
   generating, by one or more second machine learning models, a content item according to the context determined by the one or more first machine learning models;
   transmitting, by the one or more servers, to one or more second servers, a request for content to incorporate into the content item, the request indicating the context for identification of the content corresponding to the content;
   receiving, by the one or more servers, the content for incorporating into the content item from one or more second servers; and
   transmitting, by the one or more servers, the content item for display by the ATM to the user, the ATM displaying the content item for at least a portion of a duration in which the transaction is performed via the ATM.

2. The method of claim 1, wherein generating the content item comprises transmitting, by the one or more servers, a content item request to the one or more second machine learning models, the content item request identifying the content from the one or more second servers and the context for generating the content item.

3. The method of claim 1, wherein determining the context comprises:
   generating, by the one or more servers, one or more tags associated with each transaction of the transaction history;
   categorizing, by the one or more servers, each tag of the one or more tags into one or more categories, based on an association of the one or more tags; and
   determining, by the one or more servers, the context according to the one or more categories.

4. The method of claim 3, further comprising determining the context according to the one or more categories and data received from one or more sensors at the ATM.

5. The method of claim 4, wherein the one or more sensors comprise at least one of a microphone or a camera.

6. The method of claim 1, wherein the transaction history comprises a plurality of transactions with an entity associated with the ATM, wherein the plurality of transactions are across a plurality of accounts with the entity.

7. The method of claim 1, wherein the user comprises a first user, the method further comprising determining, by the one or more first machine learning models hosted on the one or more servers, the context according to the transaction history and a corresponding transaction history of a second user having demographic metrics which satisfy a matching criteria with demographic metrics of the first user.

8. The method of claim 1, wherein the one or more first machine learning models comprise at least one of a text classifier, an association rule miner, a recommender system, or a neural network, and wherein the one or more first machine learning models are trained using transaction history associated with financial accounts of the user and a search history of the user.

9. The method of claim 1, wherein the one or more second machine learning models comprise at least one of a generative adversarial network or a variational autoencoder.

10. A system comprising:
    a processing circuit comprising one or more processors and memory storing instructions that, when executed by the one or more processors, cause the processing circuit to:

receive, by one or more servers from an automated teller machine (ATM), data indicative of a user profile corresponding to a user of the ATM, the user performing a transaction via the ATM;

identify, by the one or more servers, a transaction history associated with the user profile;

determine, by one or more first machine learning models hosted on the one or more servers, a context corresponding to at least one transaction of the transaction history;

generate, by one or more second machine learning models, a content item according to the context determined by the one or more first machine learning models;

transmit, by the one or more servers, to one or more second servers, a request for content to incorporate into the content item, the request indicating the context for identification of the content corresponding to the content;

receive, by the one or more servers, the content for incorporating into the content item from one or more second servers; and transmit, by the one or more servers, the content item for display by the ATM to the user, the ATM displaying the content item for at least a portion of a duration in which the transaction is performed via the ATM.

11. The system of claim 10, wherein the instructions that cause the processing circuit to generate the content item further cause the processing circuit to transmit, by the one or more servers, a content item request to the one or more second machine learning models, the content item request identifying the content from the one or more second servers and the context for generating the content item.

12. The system of claim 10, wherein the instructions that cause the processing circuit to determine the context further cause the processing circuit to:

generate, by the one or more servers, one or more tags associated with each transaction of the transaction history;

categorize, by the one or more servers, each tag of the one or more tags into one or more categories, based on an association of the one or more tags; and determine, by the one or more servers, the context according to the one or more categories.

13. The system of claim 12, wherein the instructions further cause the processing circuit to determine the context according to the one or more categories and data received from one or more sensors at the ATM, and wherein the one or more sensors comprise at least one of a microphone or a camera.

14. The system of claim 10, wherein the transaction history comprises a plurality of transactions with an entity associated with the ATM, wherein the plurality of transactions are across a plurality of accounts with the entity.

15. The system of claim 10, wherein the user comprises a first user, the instructions further cause the processing circuit to determine, by the one or more first machine learning models hosted on the one or more servers, the context according to the transaction history and a corresponding transaction history of a second user having demographic metrics which satisfy a matching criteria with demographic metrics of the first user.

16. The system of claim 10, wherein the one or more first machine learning models comprise at least one of a text classifier, an association rule miner, a recommender system, or a neural network, and wherein the one or more first machine learning models are trained using transaction history associated with financial accounts of the user and a search history of the user.

17. An automated teller machine (ATM), comprising:
a display screen;
a communication interface;
a human-machine interface; and
a processing circuit comprising one or more processors and memory storing instructions that, when executed by the one or more processors, cause the processing circuit to:
obtain, via the human-machine interface, data indicative of a user profile corresponding to a user of the ATM, the user performing a transaction via the ATM;
transmit, via the communication interface, the data indicative of the user profile to one or more servers;
receive, via the communication interface, from the one or more servers, a content item generated according to a context corresponding to at least one transaction of a transaction history associated with the user profile;
determine an idle period of the transaction; and
display, via the display screen, the content item for at least a portion of a duration in which the transaction is performed via the ATM and during the idle period of the transaction.

* * * * *